(12) United States Patent
Ent et al.

(10) Patent No.: US 10,114,408 B2
(45) Date of Patent: Oct. 30, 2018

(54) HIDDEN COMPARTMENT WITH PORTS FOR MINI PC OR PC STICK

(71) Applicant: Lenovo (Singapore) Pte. Ltd., Singapore (SG)

(72) Inventors: Ali Kathryn Ent, Raleigh, NC (US); Cyan Godfrey, Chapel Hill, NC (US); Cuong Huy Truong, Cary, NC (US); Peter Carlson Rane, Cary, NC (US); Samuel Jackson Patterson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 15/019,803

(22) Filed: Feb. 9, 2016

(65) Prior Publication Data
US 2017/0227989 A1    Aug. 10, 2017

(51) Int. Cl.
*G06F 1/16* (2006.01)

(52) U.S. Cl.
CPC .............. *G06F 1/16* (2013.01); *G06F 1/1601* (2013.01); *G06F 1/1632* (2013.01); *G06F 1/1654* (2013.01); *G06F 2200/1612* (2013.01); *G06F 2200/1631* (2013.01)

(58) Field of Classification Search
CPC .................................................... G06F 1/1637
See application file for complete search history.

(56) References Cited

U.S. PATENT DOCUMENTS

| | | | | |
|---|---|---|---|---|
| 5,187,645 A * | 2/1993 | Spalding | ............... | G06F 1/1615 312/223.2 |
| 5,196,993 A * | 3/1993 | Herron | ................... | F16M 11/10 248/923 |
| 5,552,967 A * | 9/1996 | Seto | ........................ | G06F 1/1616 174/387 |
| 5,694,293 A * | 12/1997 | Seto | ........................ | G06F 1/1616 361/679.26 |
| 5,754,397 A * | 5/1998 | Howell | ................. | G06F 1/1632 361/679.44 |
| 6,188,569 B1 * | 2/2001 | Minemoto | ................ | G06F 1/16 312/223.2 |
| 6,229,584 B1 * | 5/2001 | Chuo | ..................... | G06F 1/1601 248/917 |
| 6,680,843 B2 * | 1/2004 | Farrow | ................. | G06F 1/1601 361/679.02 |

(Continued)

OTHER PUBLICATIONS

Ronald Tibbets, Samsung Syncmaster 245BW Widescreen LCD Monitor, Apr. 30, 2008, Benchmarkreviews.com, https://archive.benchmarkreviews.com/index.php?option=com_content&task=view&id=168&Itemid=70&limit=1&limitstart=2.*

*Primary Examiner* — Hoa C Nguyen
*Assistant Examiner* — Keith Depew
(74) *Attorney, Agent, or Firm* — Ference & Associates LLC

(57) ABSTRACT

One embodiment provides a display stand, including: a base supporting a dock; the dock having: a front that accommodates a display panel; a front face that extends upward from the front; and a back face that is substantially opposite to the front face; the back face including a cover that repositions to reveal an internal cavity disposed within the dock; the dock further including a surface forming a wall of the internal cavity, the surface having one or more power and data connectors. Other aspects are described and claimed.

14 Claims, 7 Drawing Sheets

(56) References Cited

U.S. PATENT DOCUMENTS

| | | | | |
|---|---|---|---|---|
| 6,816,364 B2* | 11/2004 | Helot | F16M 11/105 | 248/919 |
| 6,940,714 B2* | 9/2005 | Helot | G06F 1/1601 | 248/200 |
| 6,987,666 B2* | 1/2006 | Medica | F16M 11/10 | 248/424 |
| 7,126,815 B2* | 10/2006 | Hwang | F16M 11/105 | 361/679.06 |
| 7,388,744 B2* | 6/2008 | Chu | G06F 1/1601 | 361/679.27 |
| 7,555,581 B2* | 6/2009 | Martin | G06F 1/1601 | 710/303 |
| 7,597,568 B1* | 10/2009 | Lu | H05K 5/0239 | 439/137 |
| 9,286,854 B2* | 3/2016 | Klarke | H04N 21/6125 | |
| 9,448,606 B2* | 9/2016 | Harel | G06F 1/263 | |
| 9,671,829 B2* | 6/2017 | Ho | G06F 1/1656 | |
| 2005/0185365 A1* | 8/2005 | Yamaguchi | G06F 1/1601 | 361/679.21 |
| 2009/0079665 A1* | 3/2009 | Moscovitch | F16M 11/10 | 345/1.3 |
| 2010/0240239 A1* | 9/2010 | Chen | G06F 1/1616 | 439/142 |
| 2011/0043984 A1* | 2/2011 | Byrne | H02J 7/0044 | 361/679.01 |
| 2011/0216495 A1* | 9/2011 | Marx | H05K 5/02 | 361/679.22 |
| 2012/0155051 A1* | 6/2012 | Cheng | G06F 1/1656 | 361/807 |
| 2012/0170233 A1* | 7/2012 | Ku | G06F 1/181 | 361/752 |
| 2013/0021725 A1* | 1/2013 | Huang | G06F 1/1656 | 361/679.01 |
| 2013/0083254 A1* | 4/2013 | Murakami | G06F 1/1601 | 348/836 |
| 2013/0083257 A1* | 4/2013 | Murakami | G06F 1/18 | 348/839 |
| 2013/0107126 A1* | 5/2013 | Nonomura | H04N 5/64 | 348/725 |
| 2013/0117487 A1* | 5/2013 | Leung | G06F 1/1632 | 710/303 |
| 2013/0184037 A1* | 7/2013 | Hopkins | H01R 13/46 | 455/575.1 |
| 2014/0113467 A1* | 4/2014 | Senatori | G06F 1/1633 | 439/142 |
| 2014/0146446 A1* | 5/2014 | Matsuda | H04M 1/72522 | 361/679.01 |
| 2014/0185262 A1* | 7/2014 | Hashimoto | F16M 13/00 | 361/809 |
| 2015/0103483 A1* | 4/2015 | Lin | G06F 1/1632 | 361/679.43 |
| 2015/0227177 A1* | 8/2015 | McKean | G06F 1/1626 | 361/679.4 |
| 2015/0331452 A1* | 11/2015 | Byrne | G06F 1/1632 | 361/679.44 |
| 2016/0294113 A1* | 10/2016 | Mehandjiysky | G06F 1/1632 | |
| 2016/0306395 A1* | 10/2016 | Iwamoto | G06F 1/1626 | |

* cited by examiner

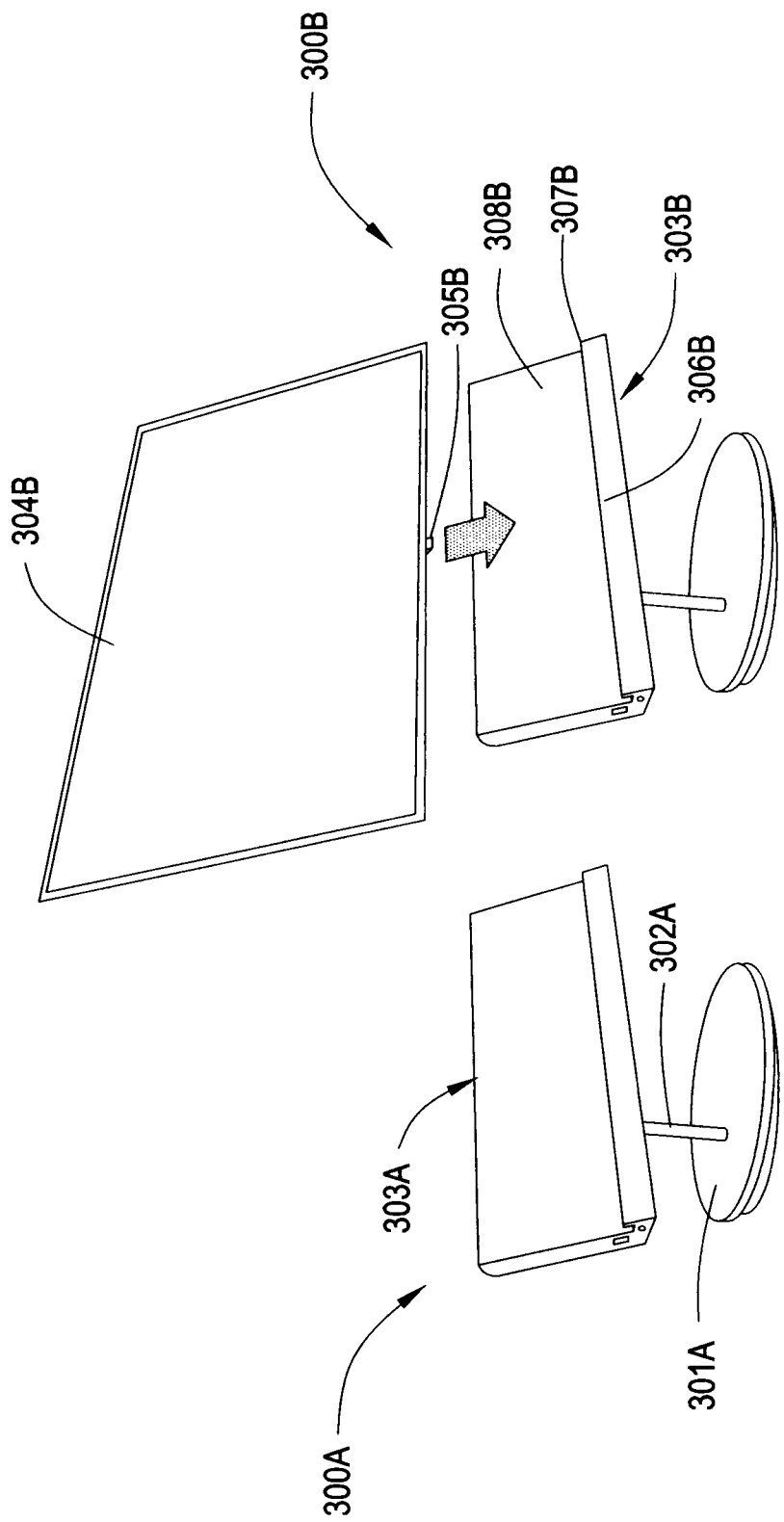

HIDDEN COMPARTMENT WITH PORTS FOR MINI PC OR PC STICK

BACKGROUND

A mini-PC (mini-personal computer) or even a removable module, e.g., external hard drive, PC stick, etc., is popular in many circumstances due to the size and portability of the computing device or module. For example, a PC stick is a small module or dongle that may be powered by a multi-core processor and offer random access memory (RAM), flash memory storage, and network connectivity such as 802.11 Wi-Fi® or other wireless connection device. A PC stick attaches to a display panel or other monitor (e.g., television), typically by physically plugging the PC stick into a port, e.g., via HDMI port, USB 2.0 port, etc. The PC stick includes an operating system as well as user interface (e.g., keyboard, mouse, etc.) support. A mini-PC offers much the same capabilities, also includes internal storage, memory and processor, and likewise takes the form of a small, portable module that, while larger than a PC stick, may still be carried about by the user, e.g., from one desk to another.

When in use, a question arises as to where to situate a mini-PC or PC stick that allows easy access, while positioning it out of sight for security purposes. Mini PCs and PC sticks are so small they present a security risk. Users often want to take mini PCs or PC sticks home at night, but if left in view and easily accessible, security is a concern. If the user is not able to take the Mini-PC or PC stick home, it often must be locked in a separate area. Moreover, some Mini PCs require cables to connect to a monitor or other device, which tends to clutter a user's workspace.

BRIEF SUMMARY

In summary, one aspect provides a display stand, comprising: a base supporting a dock; the dock comprising: a front that accommodates a display panel; a front face that extends upward from the front; and a back face that is substantially opposite to the front face; said back face comprising a cover that repositions to reveal an internal cavity disposed within the dock; said dock further comprising a surface forming a wall of the internal cavity, said surface comprising one or more power and data connectors.

Another aspect provides a system, comprising: display stand, comprising: a base supporting a dock; the dock comprising: a front that accommodates a display panel; a front face that extends upward from the front; and a back face that is substantially opposite to the front face; said back face comprising a cover that repositions to reveal an internal cavity disposed within the dock; said dock further comprising a surface forming a wall of the internal cavity, said surface comprising one or more power and data connectors; and one or more of a mini-PC and a display stick that inserts into the internal cavity and that connects to the one or more power and data connectors of the surface.

A further aspect provides a system, comprising: display stand, comprising: a base supporting a dock; the dock comprising: a front that accommodates a display panel; a front face that extends upward from the front; and a back face that is substantially opposite to the front face; said back face comprising a cover that repositions to reveal an internal cavity disposed within the dock; said dock further comprising a surface forming a wall of the internal cavity, said surface comprising one or more power and data connectors; one or more of a mini-PC and a display stick that inserts into the internal cavity and that connects to the one or more power and data connectors of the surface; and one or more display panels that attach to the front.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-B) illustrates a front view of an example display stand that supports a display panel.

DETAILED DESCRIPTION

Figure 1:
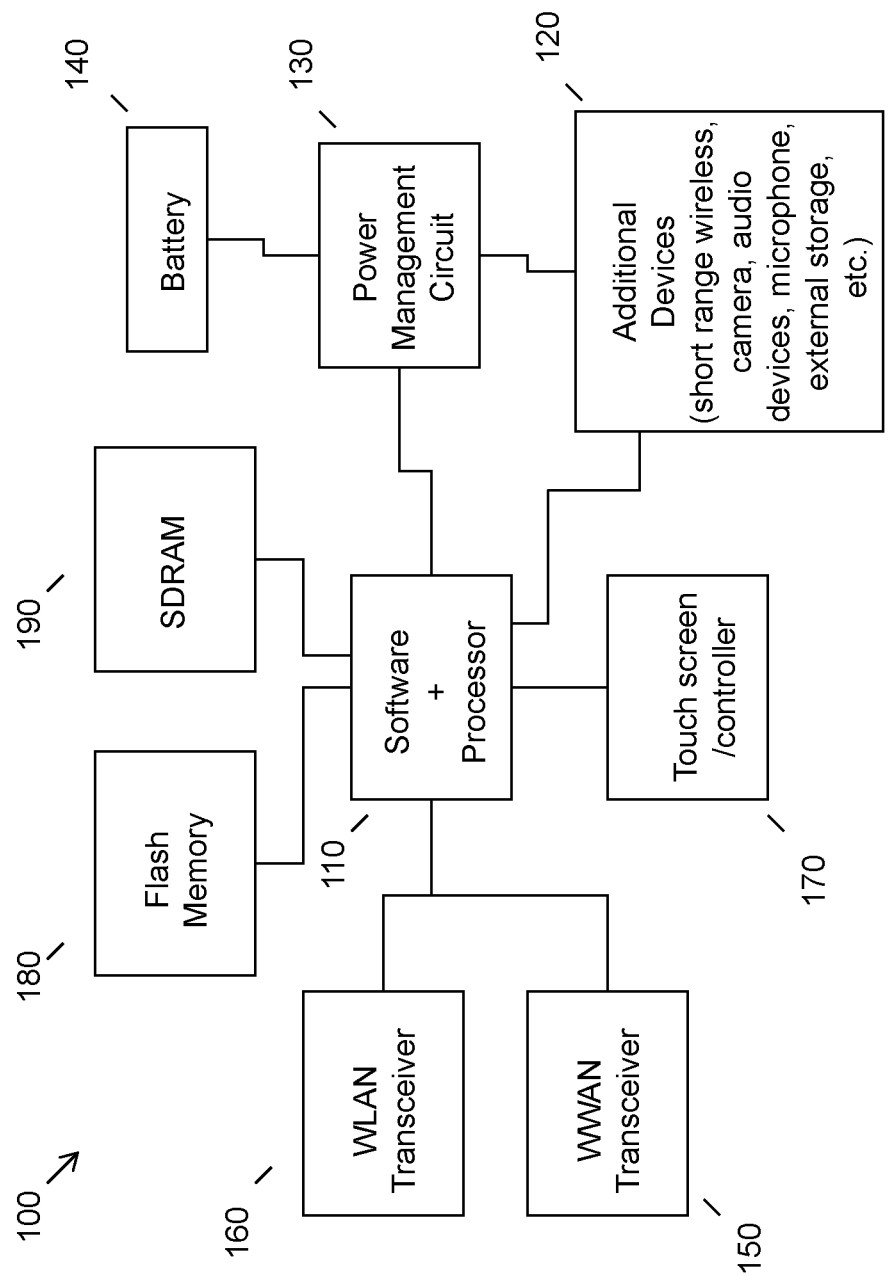
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While mini-PCs can be secured to a wall or under a desk with screws and a bracket, this is time consuming, can damage a desk or wall surfaces, and limits accessibility. Additionally, cable routing between the mini-PC and the monitor or display panel and peripherals can be complex, messy and visible. This visibility can lead to cable alteration or disconnection. Often, users have to use a tool to remove a mini-PC if they want to take it home.

Mini-PCs are often locked in a cabinet or in a wheeled cart. Access to the on/off button and port(s) is therefore often restricted, and cable routing often requires retro-fitting cabinets/carts with holes for the cabling, etc. Mini-PCs can be mounted to a monitor but are still visible, so security is still a concern.

Accordingly, an embodiment provides a display stand that includes a dock or like housing. The rear of the housing or dock has a door or cover that can be opened to insert a mini-PC or PC stick. When shut, the door or cover appears undetectable due to a patterned surface, e.g., a ribbed surface detail, which disguises the seam(s) or part lines. The internal compartment or recess has power and data ports and/or power and data connectors that align with the mini PC port and/or connector and align with a PC stick such that it can be plugged in. Thus, no cabling is required to make the connection to the dock, monitor or display panel. Power may be controlled by the power management unit of the dock or the monitor or display panel, or a keyboard accessory. Ports or like connectors may be duplicated on the monitor so there is no need to access the ports on the mini-PC.

The door or cover can be locked so that the mini-PC or PC stick are not visible, and even if someone knows that they are in the internal compartment, the lock provides for additional security.

The illustrated example embodiments will be best understood by reference to the figures. The following description is intended only by way of example, and simply illustrates certain example embodiments.

While various other circuits, circuitry or components may be utilized in information handling devices, with regard to system on chip circuitry such as found in smart phone and/or tablet circuitry 100, an example illustrated in FIG. 1 includes a design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
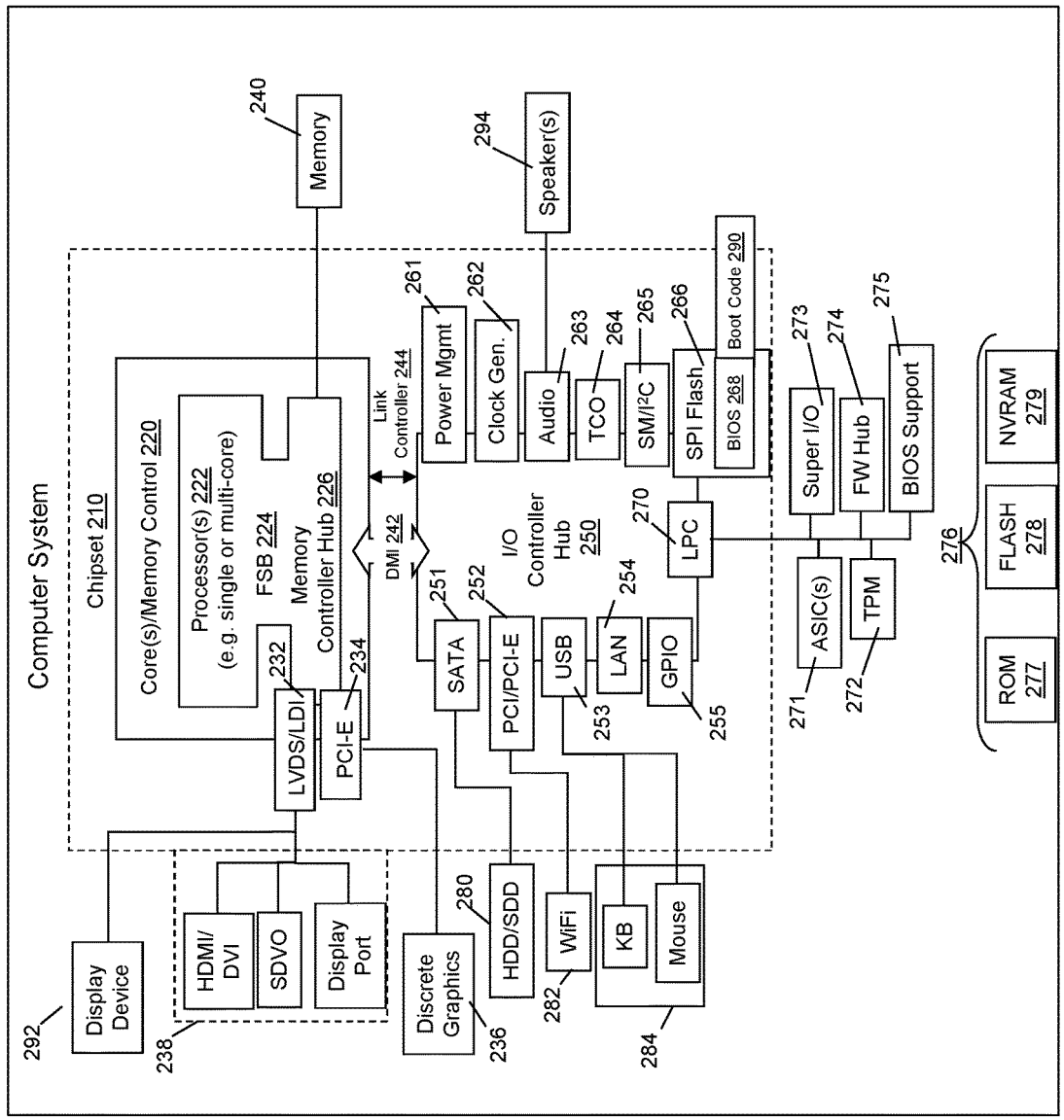
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, electromyography devices, electroencephalography devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

The circuitry outlined in FIG. 1 and/or FIG. 2 may be utilized in providing functionality to a mini-PC, a PC stick, a display panel, which may in turn comprise a mobile computing platform such as a tablet PC, the dock, or a combination of the foregoing.

In an embodiment, the display stand and dock comprise power and data connector(s) for attaching a mini-PC.

In an embodiment, the dock may comprise additional circuitry or components, e.g., offering additional computing power and resources.

In an embodiment, the dock of the display stand may comprise a housing that offers physical power and data connections to a module that inserts into the dock as well as power and data connections to a display panel.

In an embodiment, the display panel and the mini-PC and/or the PC stick combine to form a computing system facilitated by connection through the housing or dock of the display stand.

Turning to FIG. 3(A-B), a front view of a display stand 300A, 330B according to an embodiment is illustrated. The display stand 300A, 300B in turn may include a stabilizing base element 301A that supports the overall system. By way of example, the stabilizing base element 301A may be formed of a material such as metal or may be a composite of several materials in order to provide a mass that lowers the center of gravity of the display stand 300A, 300B. This reduces the chance of system instability when a fully inclusive system (i.e., having a mount accessory (not illustrated) and/or display panel(s) 304B of FIG. 3B) is formed.

The display stand 300A, 300B may connect to or be integrated with a dock or housing 303A, 303B (hereinafter simply "dock") at an upper part of the display stand 300A, 300B, as for example connected by an arm 302A, 302B. The dock at 303A may be operatively coupled to the stabilizing base element 301A, e.g., if one or more wires (not shown) extend from the stabilizing base element 301A to connect power and/or data for the dock 303A, e.g., a wired connection to a commercial power source (not shown).

As illustrated in FIG. 3B, the dock 303B accommodates a display panel 304B. The display panel 304B includes a power and data connector 305B, for example in the form of a female port that inserts over a male power and data connector 306B provided by the front ledge 307 of the dock 303B. This couples to the dock 303B and the display panel 304B, as further described herein. Referring to FIG. 3B, the display panel 304B may be mounted on a mount accessory (not illustrated) that supports one or more display panel, e.g., display panel 304B, by connection of the mount accessory to the connector 306B of the dock ledge 307B and providing one or more ledges of the mount accessory, in turn offering male connectors for display panel(s). Inclusion of ledge(s), on the dock 303B, and optionally via a mount accessory, provides support to display panels, e.g., display panel 304B, similar to an easel supporting a canvas. For example, the front ledge 307B of the dock includes a tray and front lip the stabilizes the display panel 304B when it is inserted into the dock 303B. The front ledge 307B may include audio speakers for output of audio data, alone or in connection with display of video data on the display panel(s) 304B.

Figure 4B:
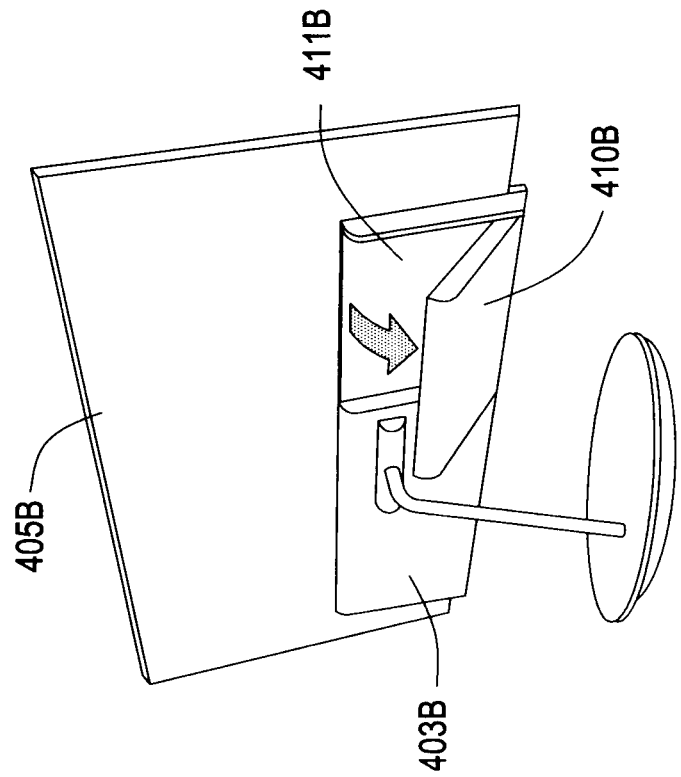
FIG. 4(A-B) illustrates a back view of an example display stand that includes a dock with a hidden compartment for a connectable module.
Figure 4A:
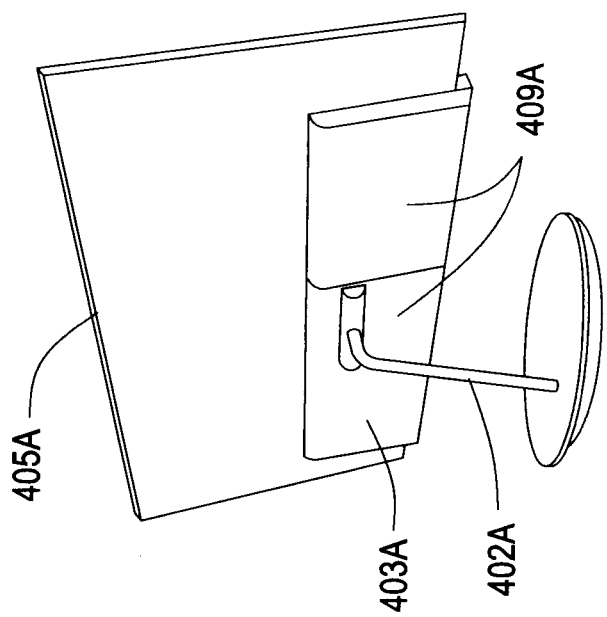

FIG. 4(A-B) illustrates a back view of the display stand according to an embodiment. As illustrated in FIG. 4A, the display stand provides a dock 403A that supports a display panel 405A. The dock 403A includes a rear surface or face 409A that attaches to the arm 402A or other support member of the display stand. The rear surface or face 409A may include a pattern, shown here as ribbing, that visually obscures any seams or part lines contained within the rear surface or face 409A.

The seams or part lines may be included in the rear surface or face 409A to provide a cover 410B, as illustrated in FIG. 4B. The cover 410B may open, e.g., via a hinge attachment to the lower portion of the dock 403B, such that the cover 410B, when opened, reveals an internal compartment or recess 411B. The internal compartment or recess 411B is hidden when the cover 410B is closed, as for example by inclusion of a visually obscuring pattern on the rear surface or face 409A. The cover 410B may open or be removed in a variety of ways to reveal the internal compartment or recess 411B. For example, the cover 410B may be slid out in an upwards motion, rather than being hingedly attached and rotated away from the rear surface or face 409A, as is illustrated in the example of FIG. 4(A-B).

Figure 5B:
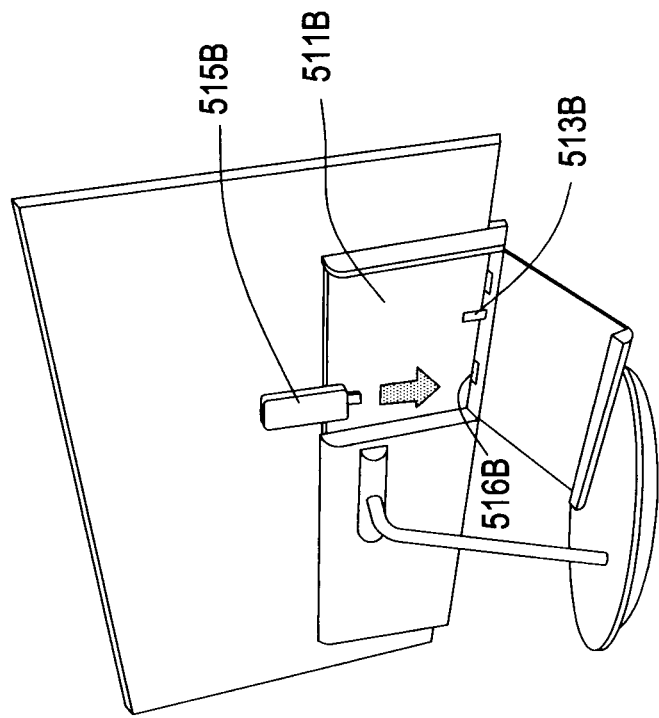
FIG. 5(A-B) illustrates insertion of a mini-PC or a PC stick into the hidden compartment of the dock.
Figure 5A:
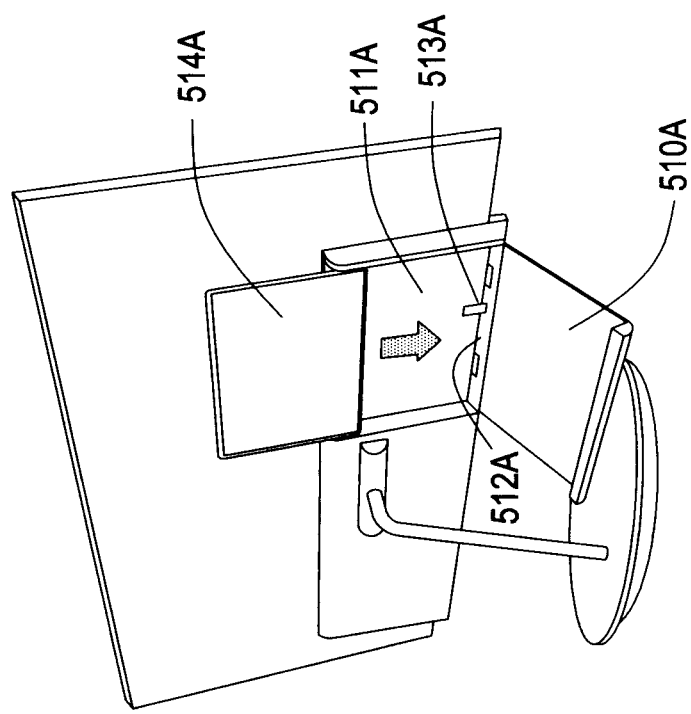

FIG. 5(A-B) illustrates that the internal compartment or recess, shown at 511A, 511B, is sized to accommodate insertion of a mini-PC 514A or a PC stick 515B. The internal compartment or recess includes a surface, shown at 512A of FIG. 5A, that provides power and data connectors. As shown in FIG. 5A, the internal surface may include a male power and data connector 513A for insertion into a female port of a mini-PC 514A. Also, as shown in FIG. 5B, the internal compartment or recess 511B may include a female port 516B for insertion of a male power and data connector of a PC stick 515B. The mini-PC 514A and PC stick 515B may be inserted into the internal compartment or recess 511A, 511B by sliding them downward to connect with the power and data connectors formed on surface 512A.

Figure 6B:
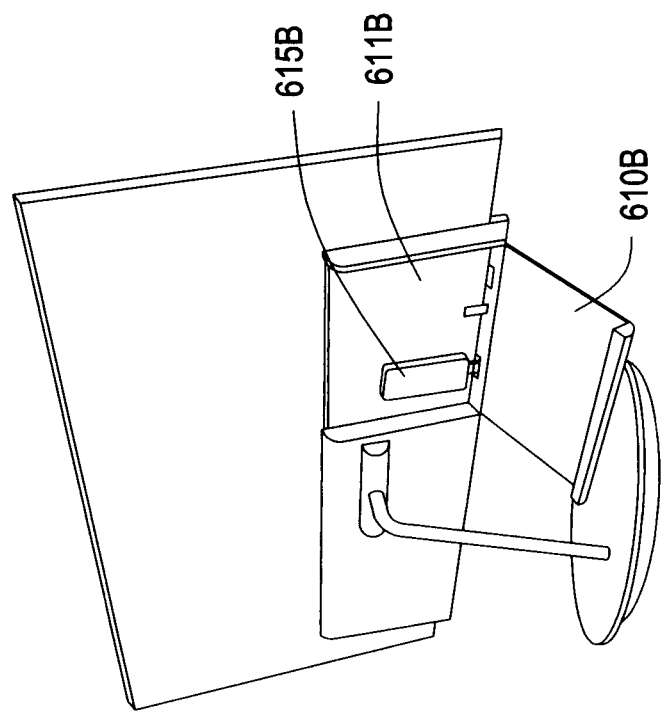
FIG. 6(A-B) illustrates inserted modules within the dock.
Figure 6A:
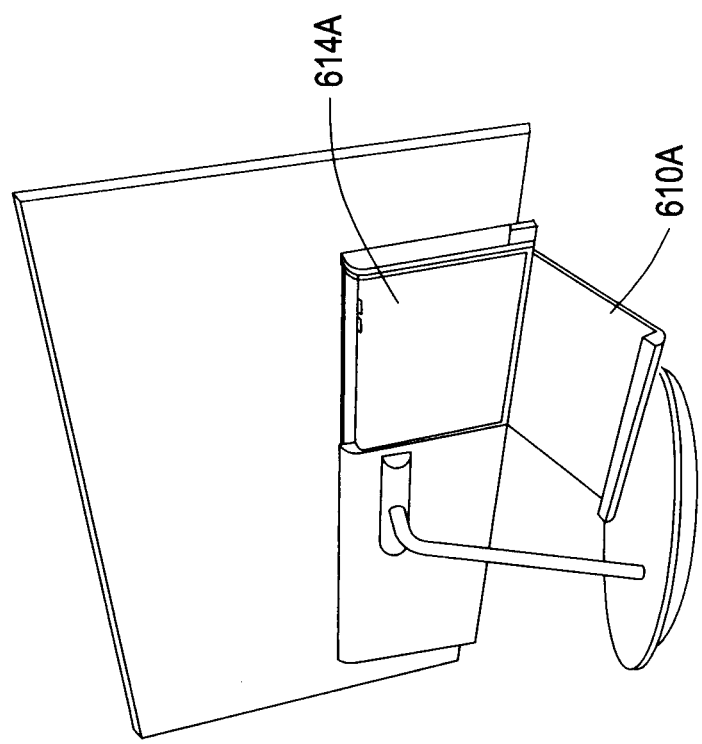

FIG. 6(A-B) provides a view of connectable modules that are inserted into the dock of the display stand. For example, FIG. 6A illustrates a mini-PC 614A that has been inserted into the internal recess or compartment of the dock and thus operatively connected to the dock. Additionally, the mini-PC 614A is operatively connected to the display panel connected to the dock, if any, by virtue of internal power and data routing offered between the dock's power and data connectors (refer to FIG. 3B, element 306B and FIG. 5A, element 513A).

FIG. 6B illustrates a PC stick 615B that has been inserted into the internal recess or compartment of the dock and thus operatively connected to the dock. Additionally, the PC stick 615B is operatively connected to the display panel connected to the dock, if any, by virtue of internal power and data routing offered between the dock's power and data connectors (refer to FIG. 3B, element 306B and FIG. 5B, element 516B).

Figure 7:
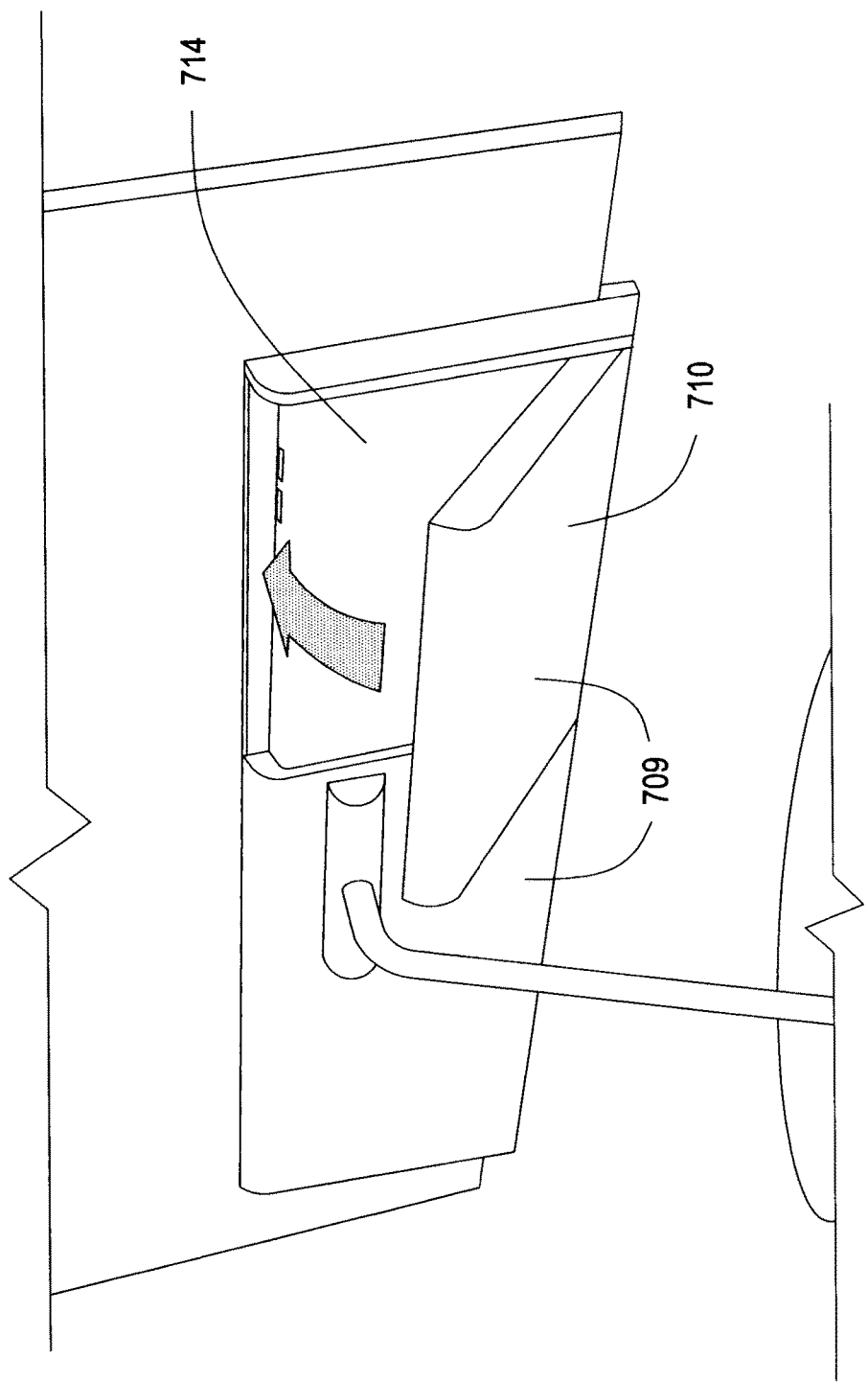
FIG. 7 illustrates a cover closure to conceal the hidden compartment including the connectable module within the dock.

The display stand offers increased security via at least two mechanisms. First, referring to FIG. 7, the cover 710 may be closed, as for example by rotating the cover 710 about the hinge provided in a lower part of the dock. This permits the cover 710 to be closed flush with the remaining back surface 709 of the dock. As such, the back surface 709 appears to be of unitary construction when the cover 710 is closed. This again may be facilitated by visually obscuring any seam lines or part lines that are formed in the back surface 709, here shown by a ribbed pattern.

Additionally, the dock provides increased security by offering a locking mechanism. The cover 710 may be closed and secured to the main housing of the dock, e.g., by a key lock or other like mechanism, such that the cover 710 cannot be opened with authorization. This permits a user to securely stow a mini-PC 714 (or PC stick, not illustrated in FIG. 7), without needing to worry about the cover 710 being opened without authorization. Thus, even if the internal compartment or recess were to be discovered, the cover 710 may be locked into place.

As provided herein, a display stand includes a stabilizing base, an arm extending from the base; and a dock including a back face or surface that provides a cover that repositions to reveal an internal recess, compartment or cavity disposed within the dock. The dock includes a front ledge that accommodates a display panel, a front face that extends upward from the front ledge and is substantially opposite the back face or surface. The dock's internal cavity includes a surface forming a wall of the internal cavity, with the surface providing one or more power and data connectors, e.g., for a mini-PC or a PC stick.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A display stand, comprising:
   a base supporting a dock;
   the dock comprising:
      a front comprising a ledge that accommodates a connectable element selected from the group consisting of a display panel and a display panel mount accessory;
      a front face that extends upward from the front; and
      a back face that is substantially opposite to the front face;
   said back face comprising a cover that repositions to reveal an internal cavity disposed within the dock;
   said dock further comprising a surface forming a wall of the internal cavity, said surface comprising one or more power and data connectors.

2. The display stand of claim 1, wherein the cover is hingedly attached to the back face.

3. The display stand of claim 2, wherein the cover is hingedly attached to a lower portion of the back face and rotates outward from a plane coincident with the back face.

4. The display stand of claim 1, wherein the one or more power and data connectors comprise a power and data connector for a connectable element selected from the group consisting of a mini-PC and a PC stick.

5. The display stand of claim 1, further comprising a lock for the cover.

6. The display stand of claim 1, wherein the ledge comprises one or more power and data connectors.

7. The display stand of claim 6, wherein the one or more power and data connectors of the ledge are operatively connected to the one or more power and data connectors of the surface of the wall of the internal cavity.

8. A system, comprising:
   display stand, comprising:
      a base supporting a dock;
      the dock comprising:
         a front comprising a ledge that accommodates a connectable element selected from the group consisting of a display panel and a display panel mount accessory;
         a front face that extends upward from the front; and
         a back face that is substantially opposite to the front face;
      said back face comprising a cover that repositions to reveal an internal cavity disposed within the dock;
      said dock further comprising a surface forming a wall of the internal cavity, said surface comprising one or more power and data connectors; and
   one or more of a mini-PC and a display stick that inserts into the internal cavity and that connects to the one or more power and data connectors of the surface.

9. The system of claim 8, wherein the cover is hingedly attached to the back face.

10. The system of claim 9, wherein the cover is hingedly attached to a lower portion of the back face and rotates outward from a plane coincident with the back face.

11. The system of claim 8, further comprising a lock for the cover.

12. The system of claim 8, wherein the ledge comprises one or more power and data connectors.

13. The system of claim 12, wherein the one or more power and data connectors of the ledge are operatively connected to the one or more power and data connectors of the surface of the wall of the internal cavity.

14. A system, comprising:
    display stand, comprising:
       a base supporting a dock;
       the dock comprising:
          a front comprising a ledge that accommodates a connectable element selected from the group consisting of a display panel and a display panel mount story;
          a front face that extends upward from the front; and
          a back face that is substantially opposite to the front face;
       said back face comprising a cover that repositions to reveal an internal cavity disposed within the dock;
       said dock further comprising a surface forming a wall of the internal cavity, said surface comprising one or more power and data connectors;
    one or more of a mini-PC and a display stick that inserts into the internal cavity and that connects to the one or more power and data connectors of the surface; and
    one or more display panels that attach to the front.

* * * * *